US012119192B2

(12) United States Patent
Mamiya et al.

(10) Patent No.: US 12,119,192 B2
(45) Date of Patent: Oct. 15, 2024

(54) HERMETIC TERMINAL AND CONTACT DEVICE USING THE HERMETIC TERMINAL

(71) Applicant: SCHOTT Japan Corporation, Koka (JP)

(72) Inventors: Ko Mamiya, Koka (JP); Masahiro Ito, Kadoma (JP)

(73) Assignee: SCHOTT JAPAN CORPORATION, Shiga (JP)

( * ) Notice: Subject to any disclaimer, the term of this patent is extended or adjusted under 35 U.S.C. 154(b) by 127 days.

(21) Appl. No.: 17/634,078

(22) PCT Filed: Mar. 16, 2021

(86) PCT No.: PCT/JP2021/010643

§ 371 (c)(1),
(2) Date: Feb. 9, 2022

(87) PCT Pub. No.: WO2021/187490

PCT Pub. Date: Sep. 23, 2021

(65) Prior Publication Data

US 2022/0262588 A1 Aug. 18, 2022

(30) Foreign Application Priority Data

Mar. 18, 2020 (JP) ................................ 2020-047811

(51) Int. Cl.
*H01H 50/14* (2006.01)
*H01H 50/54* (2006.01)
*H01H 50/64* (2006.01)

(52) U.S. Cl.
CPC .......... *H01H 50/14* (2013.01); *H01H 50/546* (2013.01); *H01H 50/641* (2013.01)

(58) Field of Classification Search
CPC .... H01H 50/14; H01H 50/546; H01H 50/641; H01H 50/023; H01H 50/54; H01H 50/02
See application file for complete search history.

(56) References Cited

U.S. PATENT DOCUMENTS 4,962,289 A 10/1990 Stegmuller
10,249,443 B2 * 4/2019 Honda .................. H01G 9/008
(Continued)

FOREIGN PATENT DOCUMENTS

CN 201898131 U 7/2011
CN 108140514 A 6/2018
(Continued)

OTHER PUBLICATIONS

Official Communication issued in corresponding Chinese Patent Application No. 202180005312.X, mailed on Apr. 8, 2024.
(Continued)

*Primary Examiner* — Bernard Rojas
(74) *Attorney, Agent, or Firm* — Keating & Bennett, LLP

(57) ABSTRACT

A contact device according to the present disclosure includes: a metal container having a through hole and an opening; a pipe lead inserted into the through hole; an insulating material that seals the metal container and the pipe lead; and a terminal base made of a low-resistance metal, the terminal base penetrating the pipe lead and being fixed to the pipe lead. The pipe lead has a fragile portion that relieves external stress.

14 Claims, 8 Drawing Sheets

(56) References Cited

U.S. PATENT DOCUMENTS

| | | | | |
|---|---|---|---|---|
| 2016/0181038 | A1 | 6/2016 | Shimizu et al. | |
| 2016/0233039 | A1 | 8/2016 | Kanematsu et al. | |
| 2017/0148596 | A1* | 5/2017 | Ozaki | H01H 50/14 |
| 2018/0286614 | A1* | 10/2018 | Morikawa | H01R 9/16 |

FOREIGN PATENT DOCUMENTS

| | | | |
|---|---|---|---|
| EP | 3 358 593 | A1 | 8/2018 |
| JP | 2014099264 | A | 5/2014 |
| JP | 2014-164978 | A | 9/2014 |
| JP | 2015-046377 | A | 3/2015 |
| JP | 2015-049939 | A | 3/2015 |
| JP | 2015-130260 | A | 7/2015 |
| JP | 2016058290 | A | 4/2016 |
| JP | 2016-119179 | A | 6/2016 |
| JP | 2016-201245 | A | 12/2016 |
| JP | 2017-069144 | A | 4/2017 |
| JP | 2018-181721 | A | 11/2018 |

OTHER PUBLICATIONS

Official Communication issued in corresponding European Patent Application No. 21770999.7, mailed on Jul. 24, 2023.

English translation of the International Search Report of the International Searching Authority for International Application PCT/JP2021/010643, mailed Jun. 8, 2021, 2 pages, Japan Patent Office, Tokyo, Japan.

Official Communication issued in corresponding Japanese Patent Application No. 2020-047811, mailed on Aug. 29, 1 2022.

Official Communication issued in corresponding Chinese Patent Application No. 202180005312.X, mailed on Dec. 2, 2023.

* cited by examiner

HERMETIC TERMINAL AND CONTACT DEVICE USING THE HERMETIC TERMINAL

TECHNICAL FIELD

The present disclosure relates to a hermetic terminal and a contact device using the hermetic terminal. More specifically, the present disclosure relates to a hermetic terminal and a contact device using the hermetic terminal, which are mounted on a high-capacitance relay device.

BACKGROUND ART

Japanese and foreign automobile manufacturers have put a hybrid vehicle (hereinafter, abbreviated as HV) into practical use as a measure against environmental problems such as global warming. Application of an HV has expanded to large vehicles, RV vehicles, and the like. Development of electric vehicles (hereinafter, abbreviated as EV) has also been active. The HV and the EV require a large motor output, and a battery to be mounted on these vehicles is a high capacity battery. In order to drive the HV and the EV stably and efficiently, a high-performance high-capacity relay is indispensable.

An on-vehicle high-capacity relay is required to have reduced size and weight, because it is mounted in a limited space. In addition, in order to improve energization performance of the relay, it is necessary to suppress a temperature rise during continuous energization as much as possible while using a low-resistance metal for the energized portion. Furthermore, since it is an in-vehicle component, robustness and reliability to withstand severe vibration and temperature load are also required.

As such a relay, for example, there is an electromagnetic relay unit described in PTL 1 (Japanese Patent Laying-Open No. 2015-046377). The electromagnetic relay unit includes an electromagnetic device, a contact device, and a trip device.

The electromagnetic device includes a first excitation coil, a mover, and a first stator. The electromagnetic device attracts the mover to the first stator by a magnetic flux generated when the first excitation coil is energized. The electromagnetic device moves the mover from a second position to a first position.

The contact device includes a fixed contact point and a movable contact point. When the movable contact point moves along with movement of the mover, the mover is turned to a closed state in which the movable contact point comes into contact with the fixed contact point when the mover is at the first position. When the mover is in the second position and a third position, the movable contact point is in an open state away from the fixed contact point.

The trip device includes a second excitation coil connected in series with the contact device. The trip device moves the mover to the third position by the magnetic flux generated in the second excitation coil due to an abnormal current greater than or equal to a specified value flowing through the contact device in the state where the mover is at the first position.

The contact device, the electromagnetic device, and the trip device are arranged side by side in one direction. The trip device is disposed on a side opposite to the contact device with respect to the electromagnetic device.

Conventionally, as a contact device constituting such an on-vehicle high-capacitance relay, a contact device that includes a space in which a fixed contact point and a movable contact point are disposed and an arc-extinguishing gas (insulating gas) is filled is used, in order to quickly extinguish an arc generated when a contact is turned off.

For example, PTL 2 (Japanese Patent Laying-Open No. 2015-049939) describes the contact device in which a space for accommodating a fixed contact point and a movable contact point is provided by joining a housing, a coupling body, a plate, and a plunger cap. In the contact device, the space surrounded by the housing, the coupling body, the plate, and the plunger cap is defined as an airtight space, and an arc-extinguishing gas containing hydrogen as a main component is sealed in the airtight space.

Some contact devices are housed in a metal container having a hermetic terminal as described in PTL 3 (Japanese Patent Laying-Open No. 2017-069144). The contact device is used in an electromagnetic relay unit that opens and closes the contact device by an electromagnetic device. The contact device includes a metal container having a through hole, a pipe lead inserted into the through hole, insulating glass sealing the metal container and the pipe lead, a terminal base made of a low-resistance metal that penetrates the pipe lead and is fixed to the pipe lead, a fixed contact point supported by the terminal base, a lid body that covers and seals a peripheral edge of an opening of the metal container, a movable contact supported by a shaft penetrating the lid body, and a movable contact point provided in the movable contact.

A hermetic terminal included in the contact device includes the metal container having the through hole, the pipe lead inserted into the through hole, the insulating glass that seals the metal container and the pipe lead, and the terminal base made of the low-resistance metal that penetrates the pipe lead and is fixed to the pipe lead.

CITATION LIST

Patent Literature

PTL 1: Japanese Patent Laying-Open No. 2015-046377

PTL 2: Japanese Patent Laying-Open No. 2015-049939

PTL 3: Japanese Patent Laying-Open No. 2017-069144

SUMMARY OF INVENTION

Technical Problem

A hermetic terminal that constitutes the conventional contact device is provided with a pipe lead for absorbing thermal expansion of a terminal base made of copper. However, when a gap between the terminal base and the pipe lead is insufficient, the pipe lead cannot absorb expansion and contraction of the terminal base, and the pipe lead itself may be deformed. In the conventional pipe lead, there has been a possibility that such deformation is propagated to an insulating material that insulates and seals the metal container and the pipe lead or to a joint portion between the terminal base and the pipe lead, and adversely affects the pipe lead.

An object of the present disclosure is to solve the above problem, and to provide a hermetic terminal having higher airtightness and a contact device using the hermetic terminal.

Solution to Problem

The present disclosure includes a metal container having a through hole, a pipe lead inserted into the through hole, an insulating material that seals the metal container and the pipe lead, and a terminal base made of a low-resistance metal, the terminal base penetrating the pipe lead and being fixed to the pipe lead. The pipe lead has a main portion and a fragile portion that relieves external stress.

By providing the fragile portion for the pipe lead of the hermetic terminal, when the pipe lead is deformed by thermal expansion of the terminal base, an external force applied to the pipe lead is received by the fragile portion, and therefore it is possible to prevent an influence of the deformation from spreading to a connecting portion between the pipe lead and the terminal base and to the insulating material that insulates and seals the pipe lead and the metal container. By providing the fragile portion for the pipe lead of the hermetic terminal, an influence of the stress is limited to a desired range. As a result, it is possible to prevent the influence from spreading to the connecting portion and the insulating material, and an important portion may be protected.

In the hermetic terminal, rigidity of the fragile portion may be lower than rigidity of the main portion, or proof stress of the fragile portion may be lower than proof stress of the main portion.

In the hermetic terminal, by making the rigidity of the fragile portion lower than the rigidity of the main portion, or making proof stress of the fragile portion lower than proof stress of the main portion, when the pipe lead is deformed by thermal expansion of the terminal base, deformation of the pipe lead may be received by the fragile portion having low rigidity or low proof stress. As a result, it is possible to prevent an influence of the deformation from spreading to a connecting portion between the pipe lead and the terminal base and to the insulating material that insulates and seals the pipe lead and the metal container. By providing the pipe lead of the hermetic terminal intendedly with the fragile portion having low rigidity or low proof stress allowing easy deformation, a deformation portion is limited to a desired range. As a result, it is possible to prevent the influence from spreading to the connecting portion and the insulating material, and an important portion may be protected.

In the hermetic terminal, the rigidity of the fragile portion may be lower than the rigidity of the main portion, and the proof stress of the fragile portion may be lower than the proof stress of the main portion.

In the hermetic terminal, by making the rigidity of the fragile portion lower than the rigidity of the main portion, and the proof stress of the fragile portion lower than the proof stress of the main portion, when the pipe lead is deformed by thermal expansion of the terminal base, deformation of the pipe lead occurs in the fragile portion having low rigidity and low proof stress, and therefore it is possible to prevent the influence of the deformation from spreading to the connecting portion between the pipe lead and the terminal base and to the insulating material that insulates and seals the pipe lead and the metal container. By providing the pipe lead of the hermetic terminal intendedly with the fragile portion having low rigidity and low proof stress allowing easy deformation, a deformation portion is limited to a desired range. As a result, it is possible to prevent the influence of deformation from spreading to the connecting portion and the insulating material and thus to protect the important portion. At the same time, since the deformation portion necessary for protection can be adjusted based on both elements of rigidity and proof stress, selection materials and shapes may be facilitated.

In the hermetic terminal, the fragile portion may include a thin portion that is thinner than the main portion.

By providing the fragile portion having the thin portion that is thinner than the main portion, when the pipe lead is deformed by thermal expansion of the terminal base, it is possible to receive the deformation of the pipe lead by the thin portion, and to prevent the influence of the deformation from spreading to the connecting portion between the pipe lead and the terminal base and to the insulating material that insulates and seals the pipe lead and the metal container. By intendedly providing the fragile portion that is easily deformed for the pipe lead of the hermetic terminal, the deformation portion is limited to a desired range. As a result, it is possible to prevent the influence of deformation from spreading to the connecting portion and the insulating material and thus to protect the important portion.

In the hermetic terminal, the pipe lead may have a stepped portion.

In the hermetic terminal, the terminal base may be made of copper, aluminum, a copper-based alloy, or an aluminum-based alloy.

In the hermetic terminal, the insulating material may be made of glass or an epoxy resin.

The present disclosure provides a contact device that is opened and closed by an electromagnetic device, the contact device including a hermetic terminal having a fragile portion that relieves an external force. The contact device that is opened and closed by an electromagnetic device includes: a metal container having a through hole and an opening; a pipe lead inserted into the through hole; an insulating material that seals the metal container and the pipe lead; a terminal base made of a low-resistance metal, the terminal base penetrating the pipe lead and being fixed to the pipe lead; a lid body that covers and seals a peripheral edge of the opening of the metal container; and a movable contact supported by a shaft penetrating the lid body. The pipe lead has a fragile portion that relieves external stress. The terminal base includes a fixed contact point, and the movable contact includes a movable contact point.

By providing the fragile portion for the pipe lead of the contact device, the external force applied to the pipe lead is received by the fragile portion, and therefore it is possible to prevent the influence of the deformation from spreading to the connecting portion between the pipe lead and the terminal base and to the insulating material that insulates and seals the pipe lead and the metal container. By providing the fragile portion for the pipe lead of the contact device, the influence of the stress is limited to a desired range. As a result, it is possible to prevent the influence from spreading to the connecting portion and the insulating material, and an important portion may be protected.

In the contact device, rigidity of the fragile portion may be lower than rigidity of the main portion, or proof stress of the fragile portion may be lower than proof stress of the main portion.

In the contact device, the rigidity of the fragile portion is made lower than the rigidity of the main portion, or proof stress of the fragile portion is made lower than proof stress of the main portion. As a result, when the pipe lead is deformed by thermal expansion of the terminal base, the deformation of the pipe lead is received by the fragile portion having low rigidity or low proof stress, and therefore it is possible to prevent the influence of the deformation from spreading to the connecting portion between the pipe lead and the terminal base and to the insulating material that insulates and seals the pipe lead and the metal container. In the contact device, by providing the pipe lead intendedly with the fragile portion having low rigidity or low proof stress allowing easy deformation, a deformation portion is limited to a desired range. As a result, it is possible to prevent the influence from spreading to the connecting portion and the insulating material, and an important portion may be protected.

For the hermetic terminal, the rigidity of the fragile portion may be lower than the rigidity of the main portion, and the proof stress of the fragile portion may be lower than the proof stress of the main portion.

In the contact device, the rigidity of the fragile portion is made lower than the rigidity of the main portion, and proof stress of the fragile portion is made lower than proof stress of the main portion. As a result, when the pipe lead is deformed by thermal expansion of the terminal base, the deformation of the pipe lead is received by the fragile portion having low rigidity and low proof stress, and therefore it is possible to prevent the influence of the deformation from spreading to the connecting portion between the pipe lead and the terminal base and to the insulating material that insulates and seals the pipe lead and the metal container. In the contact device, by providing the pipe lead intendedly with the fragile portion having low rigidity and low proof stress allowing easy deformation, the deformation portion is limited to a desired range, and it is possible to prevent the influence of deformation from spreading to the connecting portion and the insulating material, and thus to protect the important portion.

In the contact device, the fragile portion may be constituted by a thin portion that is thinner than the main portion.

In the contact device, by providing the fragile portion having the thin portion that is thinner than the main portion, when the pipe lead is deformed by thermal expansion of the terminal base, it is possible to receive the deformation of the pipe lead by the thin portion, and thus to prevent the influence of the deformation from spreading to the connecting portion between the pipe lead and the terminal base and to the insulating material that insulates and seals the pipe lead and the metal container. In the contact device, by providing the pipe lead intendedly with the thin portion that is easily deformed, the deformation portion is limited to a desired range, and it is possible to prevent the influence of deformation from spreading to the connecting portion and the insulating material and to protect the important portion.

In the contact device, the pipe lead may have a stepped portion.

In the contact device, the terminal base may be made of copper, aluminum, a copper-based alloy, or an aluminum-based alloy.

In the contact device, the insulating material may be made of glass or an epoxy resin.

Advantageous Effects of Invention

According to one embodiment of the present disclosure, it is possible to provide a hermetic terminal having higher airtightness and a contact device.

DESCRIPTION OF EMBODIMENTS

Hereinafter, a hermetic terminal and a contact device using the hermetic terminal according to the present disclosure will be described with reference to the drawings.

Figure 1:
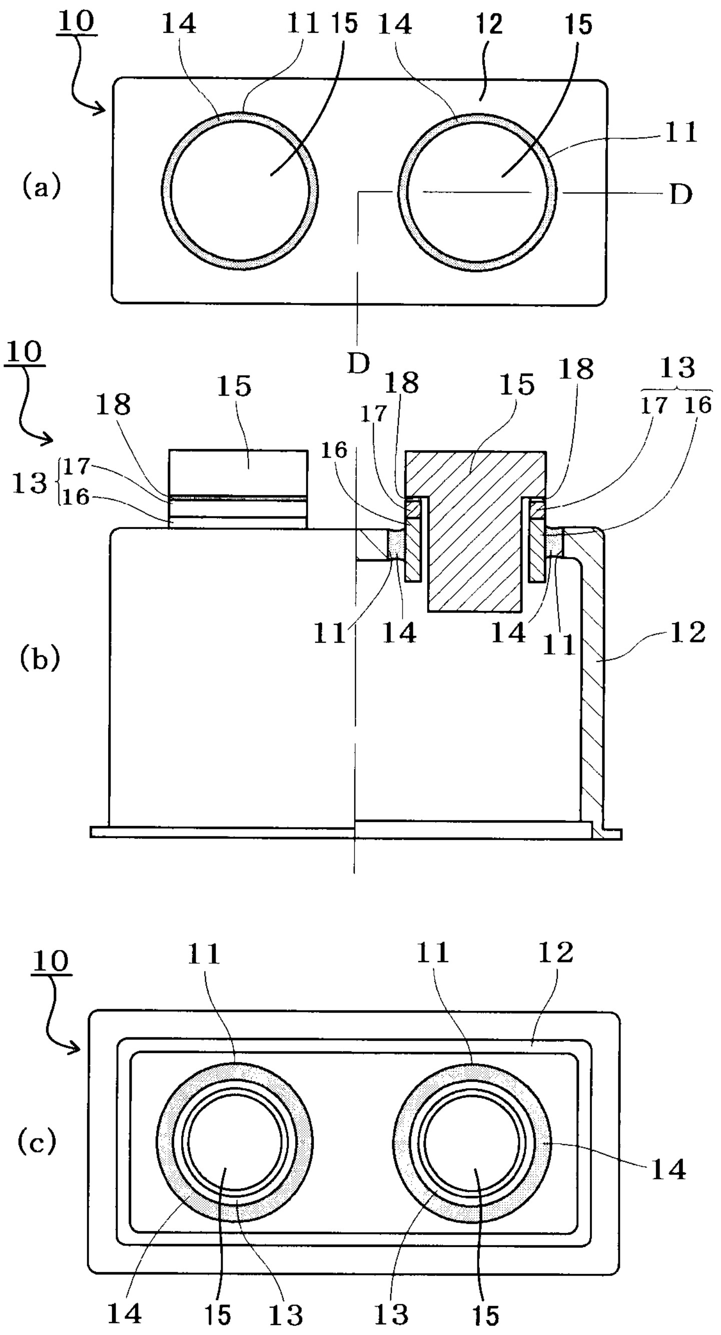
FIG. 1 illustrates a hermetic terminal according to the present disclosure, where (a) is a plan view, (b) shows a front view and a partial cross-sectional view taken along line D-D of (a), and (c) is a bottom view.

FIG. 1 illustrates a hermetic terminal 10 according to the present disclosure, where (a) is a plan view, (b) shows a front view and a partial cross-sectional view taken along line D-D of (a), and (c) is a bottom view. The terminal base in FIG. 1 may be provided integrally with a fixed contact point.

As illustrated in FIG. 1, hermetic terminal 10 according to the present disclosure includes a metal container 12 having a through hole 11, a pipe lead 13 inserted into through hole 11, an insulating material 14 made of glass or an epoxy resin that seals metal container 12 and pipe lead 13, and a terminal base 15 made of a low-resistance metal such as silver, copper, aluminum, a silver-based alloy, a copper-based alloy, or an aluminum-based alloy that penetrates pipe lead 13 and is fixed to pipe lead 13. Pipe lead 13 has a fragile portion 17 that relieves external stress.

By providing fragile portion 17 for pipe lead 13, even when pipe lead 13 is deformed by thermal expansion of terminal base 15, an external force applied to pipe lead 13 is received by fragile portion 17, and therefore it is possible to prevent an influence of the stress and the like from propagating to the connecting portion 18 between pipe lead 13 and terminal base 15 and to insulating material 14 that insulates and seals pipe lead 13 and metal container 12.

Pipe lead 13 may include, for example, a main portion 16 made of iron or an iron-based alloy, and fragile portion 17 made of a material that is more easily deformed by an external force than main portion 16, and that has low rigidity or low proof stress or that has both low rigidity and low proof stress. As a material of fragile portion 17, for example, a soft metal material such as copper, aluminum, tin, or silver, or a soft alloy containing these materials, which is different from that of main portion 16, can be used.

Alternatively, pipe lead 13 may include main portion 16 of a metal material and fragile portion 17 made of the same material weakened by induction annealing or the like. Alternatively, when pipe lead 13 is made of a soft metal material, fragile portion 17 may be provided by strengthening main portion 16 by forging or the like.

Figure 2:
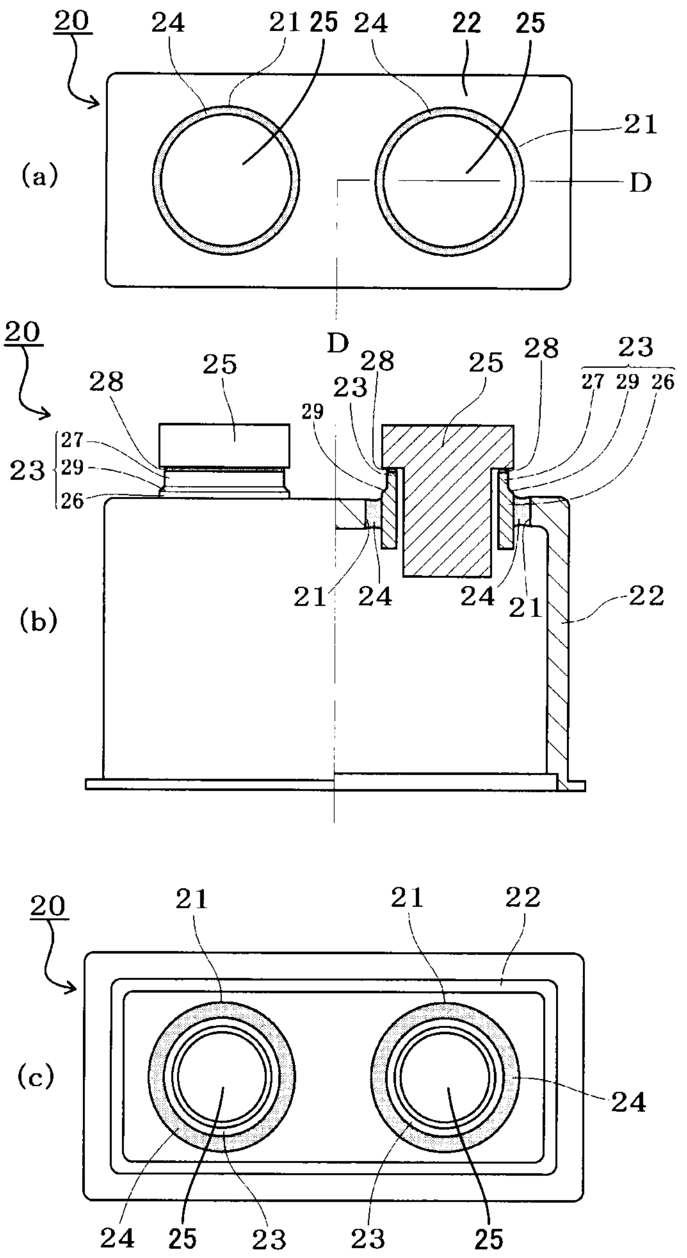
FIG. 2 illustrates a hermetic terminal according to the present disclosure, where (a) is a plan view, (b) shows a front view and a partial cross-sectional view taken along line D-D of (a), and (c) is a bottom view.

FIG. 2 illustrates a hermetic terminal 20 according to the present disclosure, where (a) is a plan view, (b) shows a front view and a partial cross-sectional view taken along line D-D of (a), and (c) is a bottom view. The terminal base in FIG. 2 may be provided integrally with the fixed contact point.

As illustrated in FIG. 2, hermetic terminal 20 according to the present disclosure includes a metal container 22 having a through hole 21, a pipe lead 23 inserted into through hole 21, an insulating material 24 made of glass or an epoxy resin that seals metal container 22 and pipe lead 23, and a terminal base 25 made of a low-resistance metal such as silver, copper, aluminum, a silver-based alloy, a copper-based alloy, or an aluminum-based alloy that penetrates pipe lead 23 and is fixed to pipe lead 23.

Pipe lead 23 includes a main portion 26 that resists deformation due to an external force, and a thin portion 27 that is more easily deformed by an external force than main portion 26, that has low rigidity or low proof stress, or has both low rigidity and low proof stress. Thin portion 27 constitutes a fragile portion.

By providing thin portion 27 for pipe lead 23, even when pipe lead 23 is deformed by thermal expansion of terminal base 25, an external force applied to pipe lead 23 can be received while stress is relieved by deformation of thin portion 27, and therefore it is possible to prevent an influence of the stress and the like from propagating to connecting portion 28 between pipe lead 23 and terminal base 25 and to insulating material 24 that insulates and seals pipe lead 23 and metal container 22.

Figure 3:
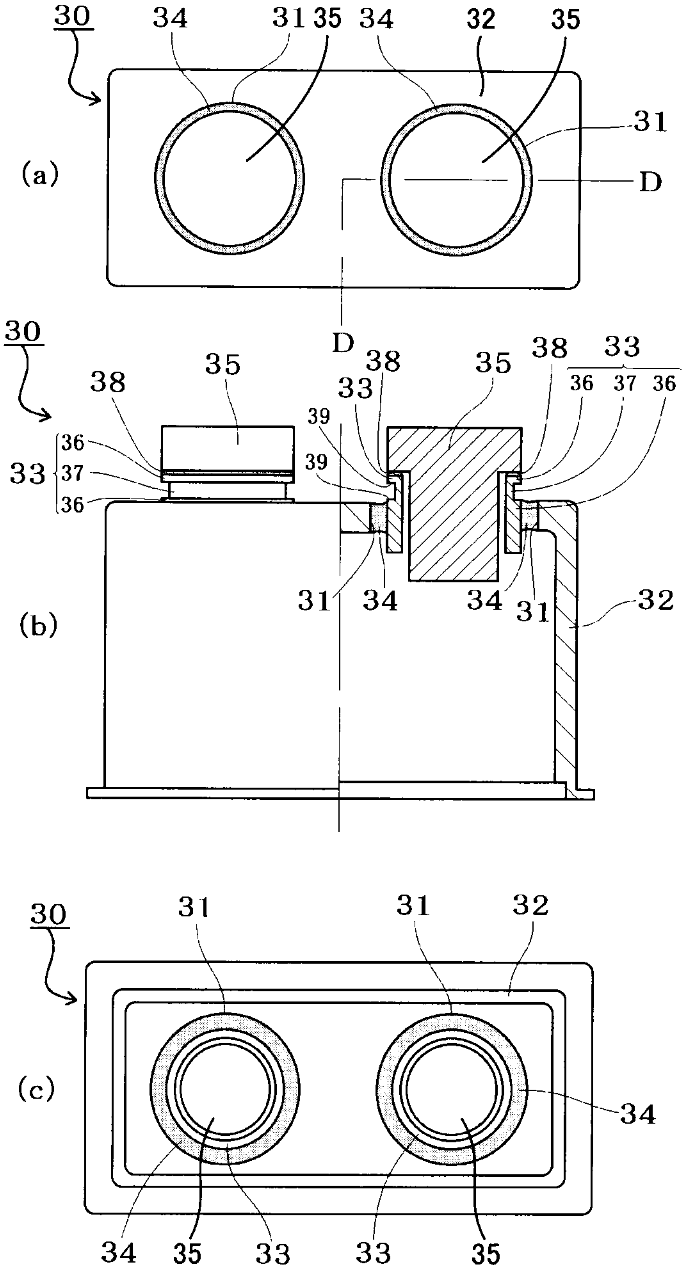
FIG. 3 illustrates a hermetic terminal according to the present disclosure, where (a) is a plan view, (b) shows a front view and a partial cross-sectional view taken along line D-D of (a), and (c) is a bottom view.

FIG. 3 illustrates a hermetic terminal 30 according to the present disclosure, where (a) is a plan view, (b) shows a front view and a partial cross-sectional view taken along line D-D of (a), and (c) is a bottom view. The terminal base in FIG. 3 may be provided integrally with the fixed contact point.

Hermetic terminal 20 described above can be deformed like hermetic terminal 30 shown in FIG. 3. That is, hermetic terminal 30 includes a metal container 32 having a through hole 31, a pipe lead 33 inserted into through hole 31, an insulating material 34 made of glass or an epoxy resin that seals metal container 32 and pipe lead 33, and a terminal base 35 made of a low-resistance metal such as silver, copper, aluminum, a silver-based alloy, a copper-based alloy, or an aluminum-based alloy that penetrates pipe lead 33 and is fixed to pipe lead 33. Pipe lead 33 includes at least a main portion 36 and a thin portion 37 that is thinner than main portion 36. Thin portion 37 constitutes the fragile portion.

By providing pipe lead 33 with main portion 36 and thin portion 37 that is thinner than main portion 36, even when pipe lead 33 is deformed by thermal expansion of terminal base 35, the deformation of pipe lead 33 is received by thin portion 37, and therefore it is possible to prevent the deformation from propagating to a connecting portion 38 between pipe lead 33 and terminal base 35 and to insulating material 34 that insulates and seals pipe lead 33 and metal container 32.

Figure 4:
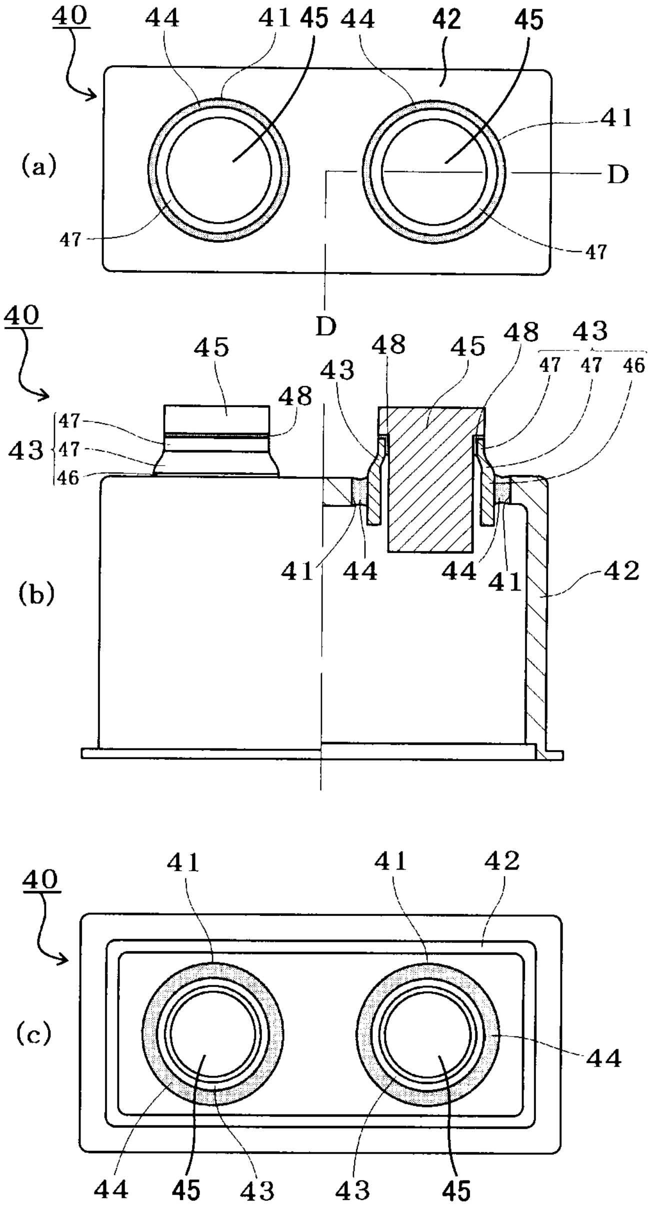
FIG. 4 illustrates a hermetic terminal according to the present disclosure, where (a) is a plan view, (b) shows a front view and a partial cross-sectional view taken along line D-D of (a), and (c) is a bottom view.

FIG. 4 illustrates a hermetic terminal according to the present disclosure, where (a) is a plan view, (b) shows a front view and a partial cross-sectional view taken along line D-D of (a), and (c) is a bottom view. The terminal base in FIG. 4 may be provided integrally with the fixed contact point.

Hermetic terminal 20 can also be deformed like a hermetic terminal 40 shown in FIG. 4.

That is, hermetic terminal 40 includes a metal container 42 having a through hole 41, a pipe lead 43 inserted into through hole 41, an insulating material 44 made of glass or an epoxy resin that seals metal container 42 and pipe lead 43, and a terminal base 45 made of a low-resistance metal such as silver, copper, aluminum, a silver-based alloy, a copper-based alloy, or an aluminum-based alloy that penetrates pipe lead 43 and is fixed to pipe lead 43. Pipe lead 43 includes at least a main portion 46 and a thin portion 47 that is thinner than main portion 46. Thin portion 47 constitutes the fragile portion.

By providing pipe lead 43 with main portion 46 and thin portion 47 that is thinner than main portion 46, even when pipe lead 43 is deformed by thermal expansion of terminal base 45, the deformation of pipe lead 43 is received by thin portion 47, and therefore it is possible to prevent the deformation from propagating to a connecting portion 48 between pipe lead 43 and terminal base 45 and to insulating material 44 that insulates and seals pipe lead 43 and metal container 42.

Figure 8:
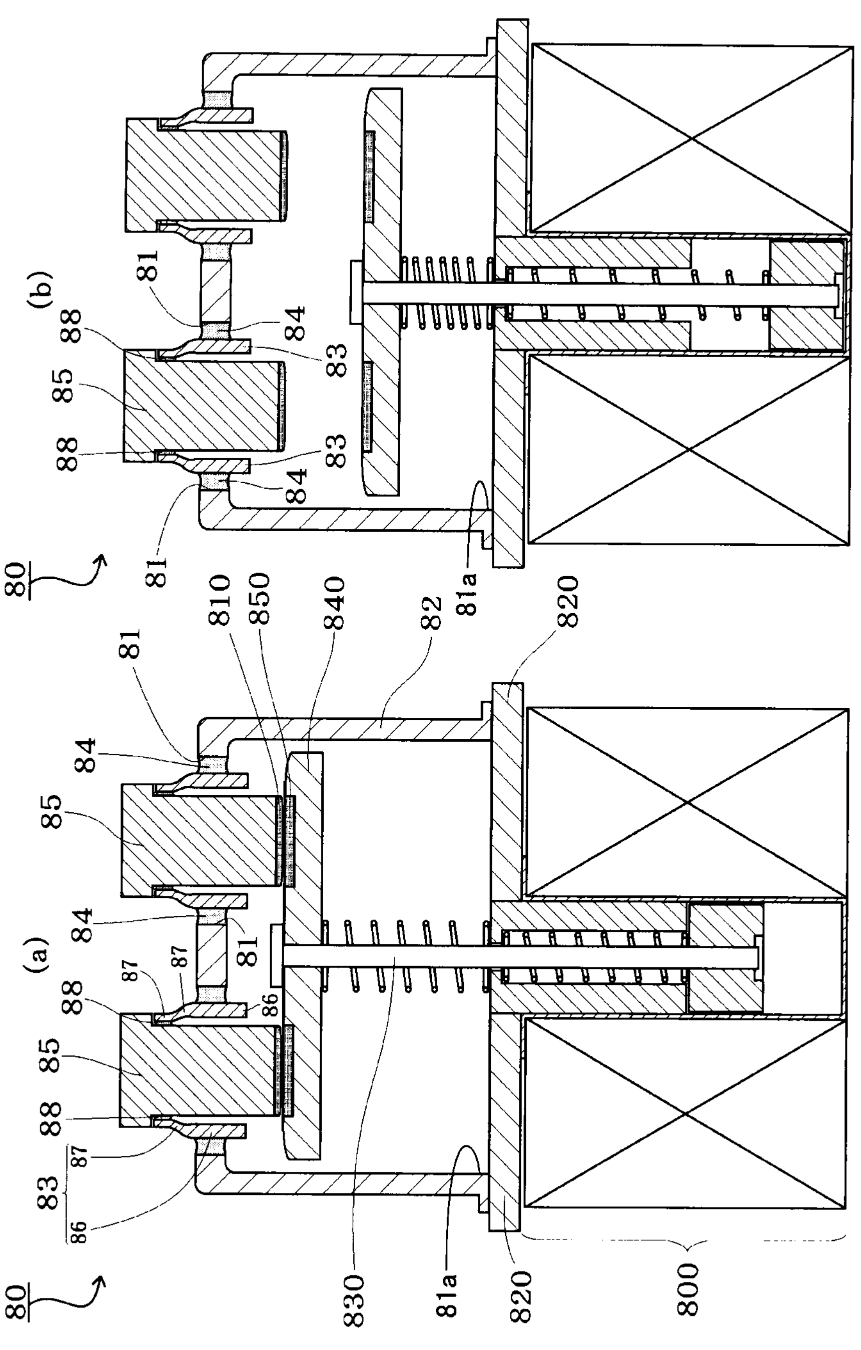
FIG. 8 illustrates a contact device according to the disclosure, where (a) is a front cross-sectional view in the closed state, and (b) is a front cross-sectional view in the open state.

In hermetic terminal 40, a diameter of thin portion 47 of pipe lead 43 is smaller than a diameter of main portion 46. As a result, as illustrated in FIG. 4, a joint area at connecting portion 48 between pipe lead 43 and terminal base 45 can be increased. As illustrated in FIG. 8 described later, pipe lead 83 can be joined only to a side wall surface of a terminal base 85. As illustrated in FIG. 2, pipe lead 23 can be joined only to a flange surface of terminal base 25. The joint portion between pipe lead 43 and terminal base 45 can be selected according to the situation.

As in hermetic terminal 20 illustrated in FIG. 2 and hermetic terminal 30 illustrated in FIG. 3, pipe lead 23, 33 may be provided with a stepped portion 29, 39 that partitions main portion 26, 36 and thin portion 27, 37. Pipe lead 23, 33 is provided with a portion that is partially fragile constituted by thin portion 27, 37 partitioned by stepped portion 29, 39 from main portion 26, 36. By deformation of thin portion 27, 37, stress applied from terminal base 25, 35 made of a low-resistance metal having a large thermal expansion coefficient is relieved.

The metal container of the hermetic terminal may be made of metal. The material of the metal container is not particularly limited, and iron, nickel, copper, aluminum, or an alloy containing these, for example, is suitable. For the pipe lead of the hermetic terminal according to the present disclosure, any material may be used as long as the fragile portion may be provided, and metal, plastic, or a composite material obtained by combining these materials may be used. Metal or plastic used for the fragile portion of the pipe lead may be combined with glass or ceramics used for the main portion to together constitute a composite material.

Both the main portion and the fragile portion of the pipe lead may be made of the same material, or the main portion and the fragile portion may be made of different materials. For example, the main portion may be made of iron or an iron-based alloy, and the fragile portion may be made of a material that is more easily deformed by an external force than the main portion and that has low rigidity or low proof stress or that has both low rigidity and low proof stress. As the material, for example, a soft metal material such as copper, aluminum, tin, or silver, or a soft alloy containing these materials, which is different from that of the main portion, can be used.

Alternatively, the pipe lead may include the main portion of a metal material and the fragile portion made of the same material weakened by induction annealing or the like. Alternatively, when the pipe lead is made of a soft metal material, the fragile portion may be provided by strengthening the main portion by forging or the like.

Figure 5:
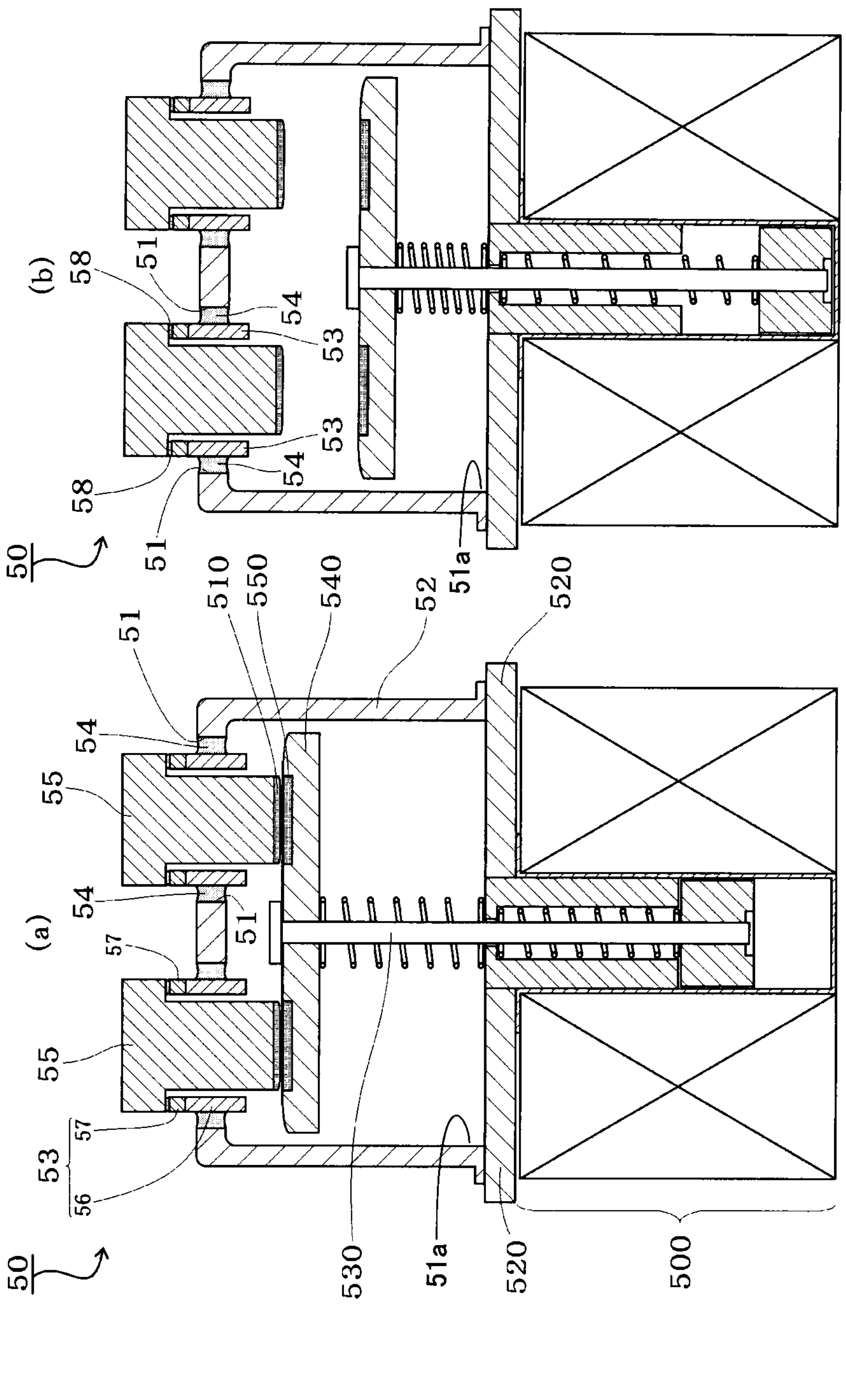
FIG. 5 illustrates a contact device according to the disclosure, where (a) is a front cross-sectional view in a closed state, and (b) is a front cross-sectional view in an open state.

FIG. 5 illustrates a contact device 50 according to the present disclosure, where (a) is a front cross-sectional view in a closed state, and (b) is a front cross-sectional view in an open state. The fixed contact point in FIG. 5 may be provided integrally with the terminal base. The movable contact point may be provided integrally with the movable contact.

As illustrated in FIG. 5, contact device 50 according to the present disclosure is a contact device using hermetic terminal 10 described above. Contact device 50 used in an electromagnetic relay unit is opened and closed by an electromagnetic device 500. Contact device 50 at least includes: a metal container 52 having a through hole 51 and an opening 51*a*; a pipe lead 53 inserted into through hole 51; an insulating material 54 made of glass or epoxy resin that seals pipe lead 53 and metal container 52; a terminal base 55 made of a low-resistance metal such as silver, copper, aluminum, a silver-based alloy, a copper-based alloy, or an aluminum-based alloy that penetrates pipe lead 53 and is fixed to pipe lead 53; a lid body 520 that covers and seals a peripheral edge of opening 51*a* of metal container 52; and a movable contact 540 supported by a shaft 530 penetrating lid body 520.

Pipe lead 53 has a fragile portion 57 that relieves external stress. Terminal base 55 has a fixed contact point 510, and movable contact 540 has a movable contact point 550.

By providing fragile portion 57 for pipe lead 53 of contact device 50, even when pipe lead 53 is deformed by thermal expansion of terminal base 55, an external force applied to pipe lead 53 is received by fragile portion 57, and therefore it is possible to prevent an influence of the stress and the like from propagating to a connecting portion 58 between pipe lead 53 and terminal base 55 and to insulating material 54 that insulates and seals pipe lead 53 and metal container 52.

Figure 6:
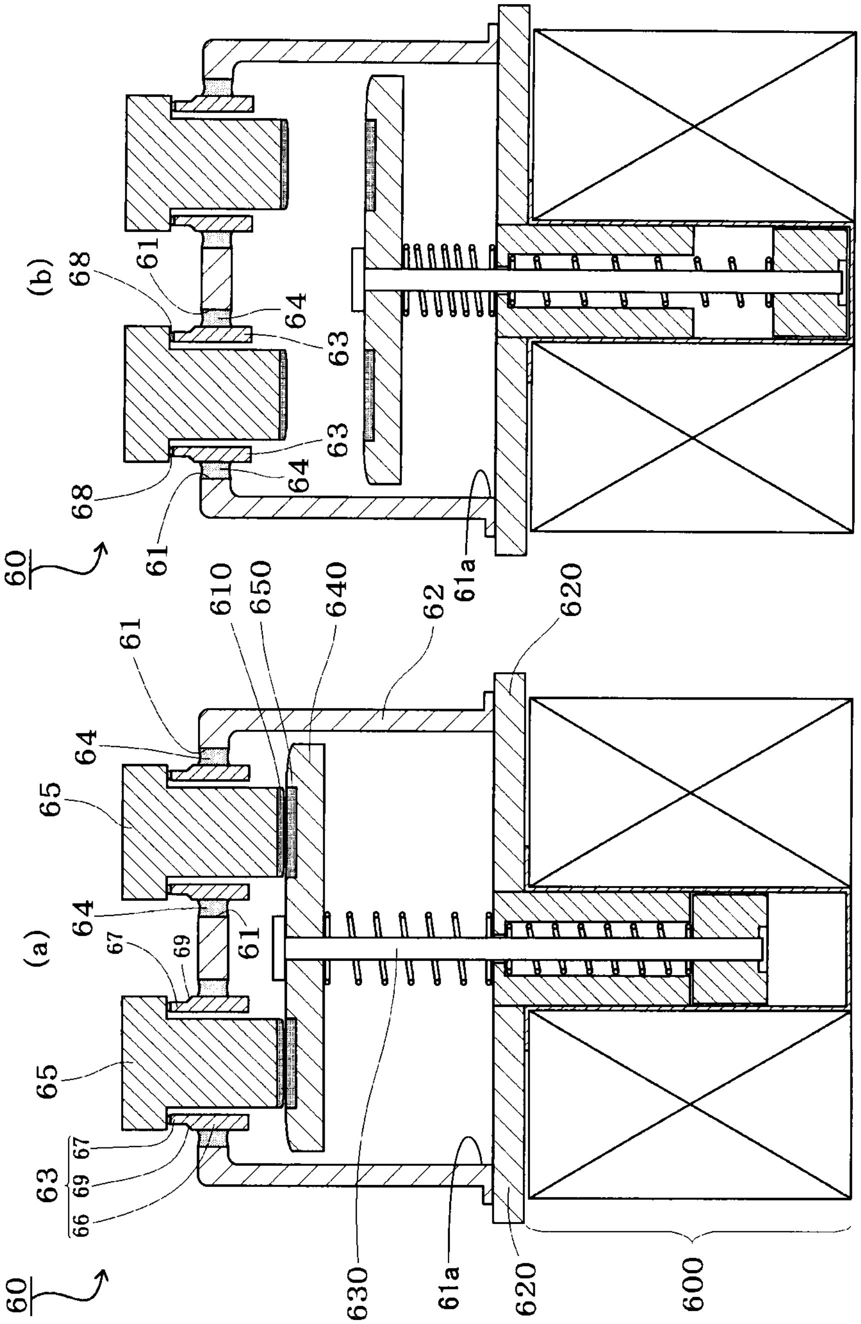
FIG. 6 illustrates a contact device according to the disclosure, where (a) is a front cross-sectional view in the closed state, and (b) is a front cross-sectional view in the open state.

FIG. 6 illustrates a contact device 60 according to the present disclosure, where (a) is a front cross-sectional view in a closed state, and (b) is a front cross-sectional view in an open state. The fixed contact point in FIG. 6 may be provided integrally with the terminal base. The movable contact point may be provided integrally with the movable contact.

As illustrated in FIG. 6, contact device 60 according to the present disclosure is a contact device using hermetic terminal 20 described above. Contact device 60 used in an electromagnetic relay unit is opened and closed by an electromagnetic device 600. Contact device 60 at least includes: a metal container 62 having a through hole 61 and an opening 61*a*; a pipe lead 63 inserted into through hole 61; an insulating material 64 made of glass or epoxy resin that seals pipe lead 63 and metal container 62; a terminal base 65 made of a low-resistance metal such as silver, copper, aluminum, a silver-based alloy, a copper-based alloy, or an aluminum-based alloy that penetrates pipe lead 63 and is fixed to pipe lead 63; a lid body 620 that covers and seals a peripheral edge of an opening 61*a* of metal container 62; and a movable contact 640 supported by a shaft 630 penetrating lid body 620.

Pipe lead 63 includes a main portion 66 that resists deformation due to an external force, and a thin portion 67 that is more easily deformed by an external force than main portion 66, that has low rigidity or low proof stress or has both low rigidity and low proof stress. Terminal base 65 has a fixed contact point 610, and movable contact 640 has a movable contact point 650.

By providing thin portion 67 for pipe lead 63 of contact device 60, even when pipe lead 63 is deformed by thermal expansion of terminal base 65, an external force applied to pipe lead 63 can be received while the external force is relieved by deformation of thin portion 67. An influence of the stress and the like is prevented from propagating to connecting portion 68 between pipe lead 63 and terminal base 65 and to insulating material 64 that insulates and seals pipe lead 63 and metal container 62.

Figure 7:
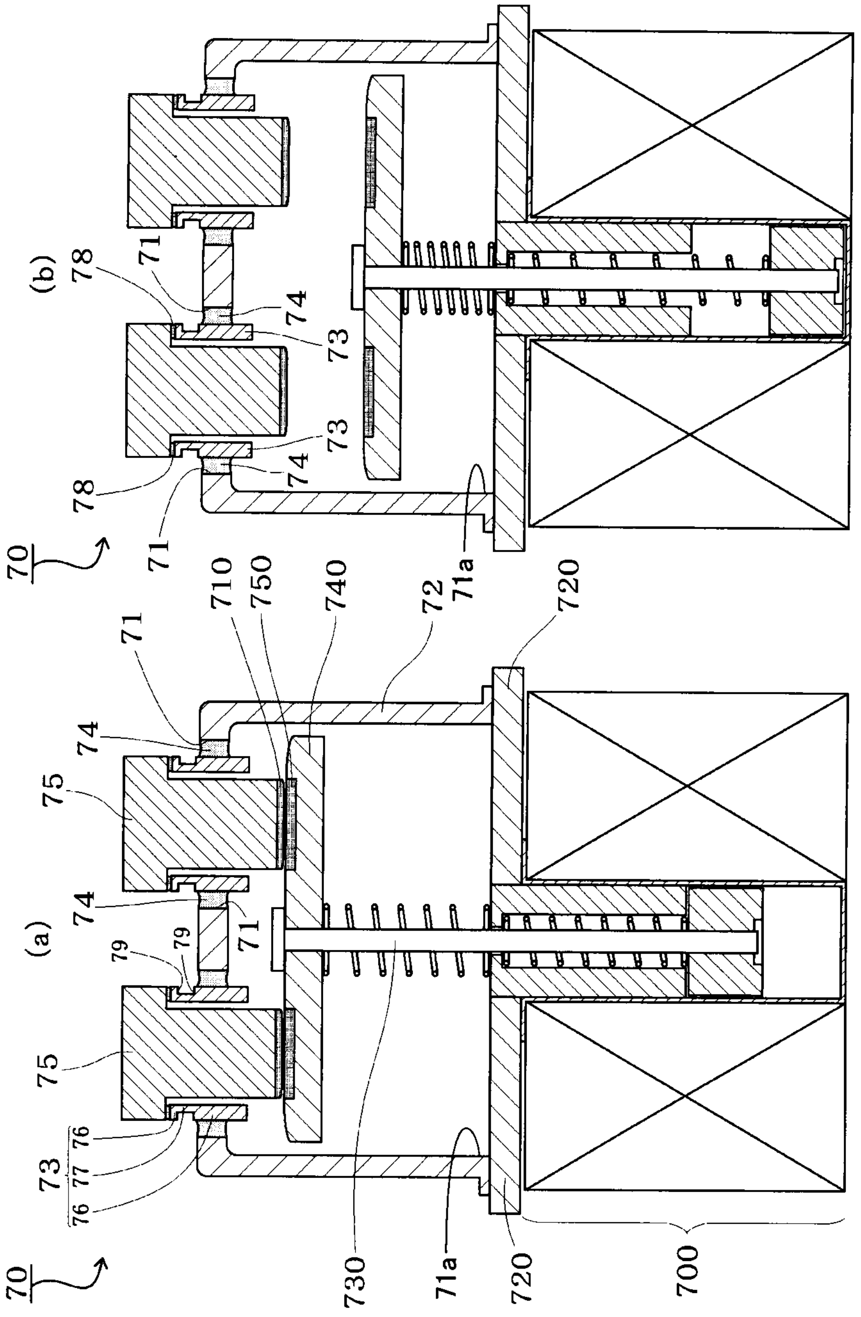
FIG. 7 illustrates a contact device according to the disclosure, where (a) is a front cross-sectional view in the closed state, and (b) is a front cross-sectional view in the open state.

FIG. 7 illustrates a contact device 70 according to the present disclosure, where (a) is a front cross-sectional view in a closed state, and (b) is a front cross-sectional view in an open state. The fixed contact point in FIG. 7 may be provided integrally with the terminal base. The movable contact point may be provided integrally with the movable contact.

Contact device 60 described above can be modified like contact device 70 shown in FIG. 7. That is, contact device 70 used in an electromagnetic relay unit is opened and closed by an electromagnetic device 700. Contact device 70 at least includes: a metal container 72 having a through hole 71 and an opening 71*a*; a pipe lead 73 inserted into through hole 71; an insulating material 74 made of glass or epoxy resin that seals pipe lead 73 and metal container 72; a terminal base 75 made of a low-resistance metal such as silver, copper, aluminum, a silver-based alloy, a copper-based alloy, or an aluminum-based alloy that penetrates pipe lead 73 and is fixed to pipe lead 73; a lid body 720 that covers and seals a peripheral edge of opening 71*a* of metal container 72; and a movable contact 740 supported by a shaft 730 penetrating lid body 720.

Pipe lead 73 includes a main portion 76 that resists deformation due to an external force, and a thin portion 77 that is more easily deformed by an external force than main portion 76, that has low rigidity or low proof stress or has both low rigidity and low proof stress. Terminal base 75 has a fixed contact point 710, and movable contact 740 has a movable contact point 750.

By providing pipe lead 73 of contact device 70 with main portion 76 and thin portion 77 that is thinner than main portion 76, even when pipe lead 73 is deformed by thermal expansion of terminal base 75, the deformation of pipe lead 73 is received by thin portion 77, and the deformation is prevented from propagating to a connecting portion 78 between pipe lead 73 and terminal base 75 and to insulating material 74 that insulates and seals pipe lead 73 and metal container 72.

FIG. 8 illustrates a contact device 80 according to the present disclosure, where (a) is a front cross-sectional view in a closed state, and (b) is a front cross-sectional view in an open state. The fixed contact point in FIG. 8 may be provided integrally with the terminal base. The movable contact point may be provided integrally with the movable contact.

Contact device 60 described above can be modified like contact device 80 shown in FIG. 8. That is, contact device 80 used in an electromagnetic relay unit is opened and closed by an electromagnetic device 800. Contact device 80 at least includes: a metal container 82 having a through hole 81 and an opening 81*a*; a pipe lead 83 inserted into through hole 81; an insulating material 84 made of glass or epoxy resin that seals pipe lead 83 and metal container 82; terminal base 85 made of a low-resistance metal such as silver, copper, aluminum, a silver-based alloy, a copper-based alloy, or an aluminum-based alloy that penetrates pipe lead 83 and is fixed to pipe lead 83; a lid body 820 that covers and seals a peripheral edge of opening 81*a* of metal container 82; and a movable contact 840 supported by a shaft 830 penetrating lid body 820.

Pipe lead 83 includes a main portion 86 that resists deformation due to an external force, and a thin portion 87 that is more easily deformed by an external force than main portion 86 that has low rigidity or low proof stress or has both low rigidity and low proof stress. Terminal base 85 has a fixed contact point 810, and movable contact 840 has a movable contact point 850.

By providing pipe lead 83 of contact device 80 with main portion 86 and thin portion 87 that is thinner than main portion 86, even when pipe lead 83 is deformed by thermal expansion of terminal base 85, the deformation of pipe lead 83 is received by thin portion 87, so that the deformation is prevented from propagating to a connecting portion 88 between pipe lead 83 and terminal base 85 and to insulating material 84 that insulates and seals pipe lead 83 and metal container 82.

In contact device 80, a diameter of thin portion 87 of pipe lead 83 is smaller than a diameter of main portion 86. As a result, as illustrated in FIG. 4, a joint area at connecting portion 48 between pipe lead 43 and terminal base 45 can be increased. As illustrated in FIG. 8, pipe lead 83 can be joined only to a side wall surface of terminal base 85. As illustrated in FIG. 2, pipe lead 23 can be joined only to a flange surface of terminal base 25. The joint portion between pipe lead 83 and terminal base 85 can be selected according to the situation.

As in contact device 60 illustrated in FIG. 6 and contact device 70 illustrated in FIG. 7, pipe lead 63, 73 may be provided with a stepped portion 69, 79 that partitions main portion 66, 76 and thin portion 67, 77. Pipe lead 63, 73 is provided with a portion that is partially fragile constituted by thin portion 67, 77 partitioned by stepped portion 69, 79 from main portion 66, 76. By deformation of thin portion 67, 77, stress applied from terminal base 65, 75 made of a low-resistance metal having a large thermal expansion coefficient is relieved.

The metal container of the contact device may be made of metal. The material of the metal container is not particularly limited, and iron, nickel, copper, aluminum, or an alloy containing these, for example, is suitable. For the pipe lead of the contact device according to the present disclosure, any material may be used as long as the fragile portion may be provided, and metal, plastic, or a composite material obtained by combining these materials may be used. Metal or plastic used for the fragile portion of the pipe lead may be combined with glass or ceramics used for the main portion to together constitute a composite material.

Both the main portion and the fragile portion of the pipe lead may be made of the same material, or the main portion and the fragile portion may be made of different materials. For example, the main portion may be made of iron or an iron-based alloy, and the fragile portion may be made of a material that is more easily deformed by an external force than the main portion, and that has low rigidity or low proof stress or that has both low rigidity and low proof stress. As the material, for example, a soft metal material such as copper, aluminum, tin, or silver, or a soft alloy containing these materials, which is different from that of the main portion, can be used.

Alternatively, the pipe lead may include the main portion of a metal material and the fragile portion made of the same material weakened by induction annealing or the like. Alternatively, when the pipe lead is made of a soft metal material, the main portion may be made stronger than the fragile portion by forging or the like.

The lid body of the contact device according to the present disclosure only needs to be able to seal a bottom opening end of the metal container. The material of the lid body is not particularly limited, and metal, plastic, glass, ceramics, or a composite material obtained by combining these materials, for example, may be used.

In the contact device according to the present disclosure, an inner wall surface of the metal container and the lid body may be provided with a heat-resistant insulating material or a lining of the heat-resistant insulating material as necessary, in order to improve heat resistance and insulation properties.

EXAMPLE

As illustrated in FIG. 1, hermetic terminal 10 of Example 1 according to the present disclosure includes metal container 12 made of iron and having through hole 11, pipe lead 13 made of an Fe—Ni alloy and inserted into through hole 11, insulating material 14 made of soda-barium glass and airtightly sealing metal container 12 and pipe lead 13, and terminal base 15 made of a copper alloy and penetrating pipe lead 13 and airtightly fixed to pipe lead 13. Pipe lead 13 is formed in a tubular shape. Fragile portion 17 of pipe lead 13 is made of a material having lower rigidity than main portion 16, and is integrated with main portion 16.

Main portion 16 and fragile portion 17 of hermetic terminal 10 may be integrated by fixing different materials through a predetermined process. In this case, as a configuration of pipe lead 13 can be selected without considering an influence of a bonding condition with insulating material 14 (for example, such as temperature for glass sealing), a degree of freedom in material selection increases.

Fragile portion 17 may be formed of the same member as main portion 16, and may be formed by heat treatment (for example, annealing or the like). Alternatively, fragile portion 17 may be provided by strengthening main portion 16 by forging or the like. In this case, since main portion 16 and fragile portion 17 can be formed of the same member, the number of parts can be reduced, and management time and effort can be saved.

By providing pipe lead 13 with main portion 16 and fragile portion 17 made of a material having lower rigidity than main portion 16, even when pipe lead 13 is deformed by thermal expansion of terminal base 15, the deformation of pipe lead 13 is received by fragile portion 17, and therefore it is possible to prevent the deformation from propagating to insulating material 14 that insulates and seals pipe lead 13 and metal container 12.

As illustrated in FIG. 2, hermetic terminal 20 of Example 2 according to the present disclosure includes metal container 22 made of an alloy 42 (42% Ni—Fe alloy) and having through hole 21, pipe lead 23 made of a Kovar alloy (29% Ni-17% Co—Fe alloy) and inserted into through hole 21, insulating material 24 made of borosilicate glass and airtightly sealing metal container 22 and pipe lead 23, and terminal base 25 made of a copper alloy penetrating pipe lead 23 and airtightly fixed to pipe lead 23. Pipe lead 23 has an outer end that is made thin. Pipe lead 23 includes main portion 26, thin portion 27 that is thinner than main portion 26, and stepped portion 29 that partitions main portion 26 and thin portion 27. Thin portion 27 constitutes the fragile portion having lower rigidity than main portion 26.

Hermetic terminal 20 can constitute pipe lead 23 without being affected by the bonding condition with insulating material 24, and the degree of freedom in material selection increases. By configuring the fragile portion by thin portion 27, rigidity can be adjusted depending on the thickness, and therefore the degree of freedom in material selection increases. Thin portion 27 may be formed of the same member as main portion 26, and may be formed by machining to be thinner than main portion 26. In this case, the number of parts can be reduced, and management time and effort can be saved.

Example 2 can be modified like hermetic terminal 30 of Example 3 shown in FIG. 3. That is, hermetic terminal 30 includes metal container 32 made of iron and having through hole 31, pipe lead 33 made of an Fe—Ni alloy and inserted into through hole 31, insulating material 34 made of soda-barium glass and airtightly sealing metal container 32 and pipe lead 33, and terminal base 35 made of a copper alloy and penetrating pipe lead 33 and airtightly fixed to pipe lead 33. Pipe lead 33 includes main portion 36, thin portion 37 that is thinner than main portion 36, and two stepped portions 39 that partition main portion 36 and thin portion 37. In pipe lead 33 of hermetic terminal 30 of Example 3, by providing stepped portions 39 also at an upper end of pipe lead 33, a width of connecting portion 38 can be widened, and reliability of the connection is increased.

Further, Example 2 can be modified like hermetic terminal 40 of Example 4 shown in FIG. 4. That is, hermetic terminal 40 includes metal container 42 made of an alloy 42 and having through hole 41, pipe lead 43 made of a Kovar alloy and inserted into through hole 41, insulating material 44 made of borosilicate glass and airtightly sealing metal container 42 and pipe lead 43, and terminal base 45 made of a copper alloy and penetrating pipe lead 43 and airtightly fixed to pipe lead 43. Pipe lead 43 includes a main portion 46 and thin portion 47 that is thinner than main portion 46. In hermetic terminal 40, the diameter of thin portion 47 of pipe lead 43 is smaller than the diameter of main portion 46. In this case, by joining thin portion 47 to a side wall surface of terminal base 45 and a flange surface of a head portion, the joint area at connecting portion 48 can be further increased.

The hermetic terminals of Examples 1 to 4 illustrated in FIGS. 1 to 4 can be used respectively as the hermetic terminals of the contact devices illustrated in FIGS. 5 to 8.

As illustrated in FIG. 5, contact device 50 according to Example 5 of the present disclosure is used in an electromagnetic relay unit, and is opened and closed by electromagnetic device 500. Contact device 50 includes a metal container 52 made of carbon steel and having through hole 51, pipe lead 53 made of an Fe—Ni alloy and inserted into through hole 51, insulating material 54 made of soda-barium glass and airtightly sealing pipe lead 53 and metal container 52, terminal base 55 made of a copper alloy that penetrates pipe lead 53 and is airtightly fixed to pipe lead 53, fixed contact point 510 supported by terminal base 55, lid body 520 made of an Fe—Ni alloy and covering and airtightly sealing a peripheral edge of an opening of metal container 52, movable contact 540 supported by shaft 530 penetrating lid body 520, and movable contact point 550 provided in movable contact 540. Movable contact 540 is biased by a spring so as to come into contact with fixed contact point 510.

Pipe lead 53 includes a main portion 56 that resists an external force, and fragile portion 57 that is more fragile than main portion 56 and provided by annealing an end portion of main portion 56 on a side of terminal base 55 by high-frequency heating. By providing pipe lead 53 of contact device 50 with main portion 56 and fragile portion 57 that is more fragile than main portion 56, even when pipe lead 53 is deformed due to thermal expansion of terminal base 55, the deformation of pipe lead 53 is received by fragile portion 57, and therefore it is possible to prevent the deformation from propagating to insulating material 54 that insulates and seals pipe lead 53 and metal container 52.

As illustrated in FIG. 6, contact device 60 according to Example 6 of the present disclosure is used in an electromagnetic relay unit, and is opened and closed by electromagnetic device 600. Contact device 60 includes metal container 62 made of alloy 42 and having through hole 61, pipe lead 63 made of a Kovar alloy and inserted into through hole 61, insulating material 64 made of borosilicate glass and airtightly sealing pipe lead 63 and metal container 62, terminal base 65 made of a copper alloy penetrating pipe lead 63 and airtightly fixed to pipe lead 63, fixed contact point 610 supported by terminal base 65, lid body 620 made of carbon steel and covering and airtightly sealing a peripheral edge of an opening of metal container 62, movable contact 640 supported by shaft 630 penetrating lid body 620, and movable contact point 650 provided in movable contact 640. Movable contact 640 is biased by a spring so as to come into contact with fixed contact point 610.

Pipe lead 63 includes main portion 66, thin portion 67 that is thinner than main portion 66, and stepped portion 69 that partitions main portion 66 and thin portion 67. By providing pipe lead 63 of contact device 60 with main portion 66 and thin portion 67 that is thinner than main portion 66, even when pipe lead 63 is deformed due to thermal expansion of terminal base 65, the deformation of pipe lead 63 is received by thin portion 67, and therefore it is possible to prevent the deformation from propagating to insulating material 64 that insulates and seals pipe lead 63 and metal container 62.

Example 6 can be modified to contact device 70 of Example 7 illustrated in FIG. 7. That is, contact device 70 includes: metal container 72 made of iron and having through hole 71; pipe lead 73 made of an Fe—Ni alloy and inserted into through hole 71; insulating material 74 made of soda-barium glass and airtightly sealing metal container 72 and pipe lead 73; terminal base 75 made of a copper alloy and penetrating pipe lead 73 and airtightly fixed to pipe lead 73; fixed contact point 710 supported by terminal base 75; lid body 720 made of carbon steel and covering and airtightly sealing a peripheral edge of an opening of metal container 72; movable contact 740 supported by shaft 730 penetrating lid body 720; and movable contact point 750 provided in the movable contact 740. Movable contact 740 is biased by a spring so as to come into contact with fixed contact point 710.

Pipe lead 73 includes main portion 76, thin portion 77 that is thinner than main portion 76, and two stepped portions 79 that partition main portion 76 and thin portion 77. In pipe lead 73 of Example 7, by providing stepped portions 79 also at an upper end of pipe lead 73, a width of connecting portion 78 can be widened, and reliability of the connection is increased.

Example 6 can be modified to contact device 80 of Example 8 illustrated in FIG. 8. That is, contact device 80 includes metal container 82 made of alloy 42 and having through hole 81, pipe lead 83 made of a Kovar alloy and inserted into through hole 81, insulating material 84 made of borosilicate glass and airtightly sealing metal container 82 and pipe lead 83, terminal base 85 made of a copper alloy penetrating pipe lead 83 and airtightly fixed to pipe lead 83, fixed contact point 810 supported by terminal base 85, lid body 820 made of alloy 42 and covering and airtightly sealing a peripheral edge of an opening of metal container 82, movable contact 840 supported by shaft 830 penetrating lid body 820, and movable contact point 850 provided in movable contact 840. Movable contact 840 is biased by a spring so as to come into contact with fixed contact point 810.

Pipe lead 83 includes a main portion 86 and thin portion 87 that is thinner than main portion 86. In contact device 80 of Example 6, the diameter of thin portion 87 of pipe lead 83 is smaller than the diameter of main portion 86. Accordingly, connecting portion 88 can be joined only to the side wall surface of terminal base 85.

Although the embodiments of the present disclosure have been described, the embodiments disclosed herein should be considered to be illustrative in all respects and not restrictive. The scope of the present disclosure is defined by the claims, and is intended to include meanings equivalent to the claims and all modifications within the scope.

INDUSTRIAL APPLICABILITY

The present disclosure is applicable to a hermetic terminal in general including a hermetic terminal mounted on a system main relay device mounted on a vehicle such as an HV or an EV, and a relay device in general including a system main relay mounted on an HV, an EV, or the like.

REFERENCE SIGNS LIST

10, 20, 30, 40: hermetic terminal
11, 21, 31, 41, 51, 61, 71, 81: through hole
12, 22, 32, 42, 52, 62, 72, 82: metal container
13, 23, 33, 43, 53, 63, 73, 83: pipe lead
14, 24, 34, 44, 54, 64, 74, 84: insulating material
15, 25, 35, 45, 55, 65, 75, 85: terminal base
16, 26, 36, 46, 56, 66, 76, 86: main portion
17, 57: fragile portion
18, 28, 38, 48, 58, 68, 78, 88: connecting portion
27, 37, 47, 67, 77, 87: thin portion (fragile portion)
29, 39, 59, 69, 79: stepped portion
50, 60, 70, 80: contact device
51*a*, 61*a*, 71*a*, 81*a*: opening
320, 520, 620, 720, 820: lid body
500, 600, 700, 800: electromagnetic device
510, 610, 710, 810: fixed contact point
530, 630, 730, 830: shaft
540, 640, 740, 840: movable contact
550, 650, 750, 850: movable contact point

The invention claimed is:

1. A hermetic terminal comprising:
a metal container having a through hole;
a pipe lead inserted into the through hole;
an insulating material that seals the metal container and the pipe lead; and
a terminal base made of a low-resistance metal, the terminal base penetrating the pipe lead and being fixed to the pipe lead, wherein
the pipe lead has a main portion and a fragile portion that relieves external stress, and
the insulating material seals the main portion of the pipe lead to the metal container, and does not seal the fragile portion of the pipe lead to the metal container.

2. The hermetic terminal according to claim 1, wherein rigidity of the fragile portion is lower than rigidity of the main portion, or proof stress of the fragile portion is lower than proof stress of the main portion.

3. The hermetic terminal according to claim 1, wherein rigidity of the fragile portion is lower than rigidity of the main portion, and proof stress of the fragile portion is lower than proof stress of the main portion.

4. The hermetic terminal according to claim 1, wherein the fragile portion includes a thin portion that is thinner than the main portion.

5. The hermetic terminal according to claim 1, wherein the pipe lead has a stepped portion.

6. The hermetic terminal according to claim 1, wherein the low-resistance metal is the terminal base is made of copper, aluminum, a copper-based alloy, or an aluminum-based alloy.

7. The hermetic terminal according to claim 1, wherein the insulating material is made of glass or an epoxy resin.

8. A contact device that is opened and closed by an electromagnetic device, the contact device comprising:
a metal container having a through hole and an opening;
a pipe lead inserted into the through hole;
an insulating material that seals the metal container and the pipe lead;
a terminal base made of a low-resistance metal, the terminal base penetrating the pipe lead and being fixed to the pipe lead;
a lid body that covers and seals a peripheral edge of the opening of the metal container; and
a movable contact supported by a shaft penetrating the lid body, wherein
the pipe lead has a main portion and a fragile portion that relieves external stress, the terminal base has a fixed contact point, and the movable contact has a movable contact point, and
the insulating material seals the main portion of the pipe lead to the metal container, and does not seal the fragile portion of the pipe lead to the metal container.

9. The contact device according to claim 8, wherein rigidity of the fragile portion is lower than rigidity of the main portion, or proof stress of the fragile portion is lower than proof stress of the main portion.

10. The contact device according to claim 8, wherein rigidity of the fragile portion is lower than rigidity of the main portion, and proof stress of the fragile portion is lower than proof stress of the main portion.

11. The contact device according to claim 8, wherein the fragile portion includes a thin portion that is thinner than the main portion.

12. The contact device according to claim 8, wherein the pipe lead has a stepped portion.

13. The contact device according to claim 8, wherein the low-resistance metal is the terminal base is made of copper, aluminum, a copper-based alloy, or an aluminum-based alloy.

14. The contact device according to claim 8, wherein the insulating material is made of glass or an epoxy resin.

* * * * *